United States Patent
Badiqué

[11] Patent Number: 6,167,143
[45] Date of Patent: Dec. 26, 2000

[54] MONITORING SYSTEM

[75] Inventor: Eric Badiqué, Nürnberg, Germany

[73] Assignee: U.S. Philips Corporation, New York, N.Y.

[21] Appl. No.: 08/644,939

[22] Filed: May 13, 1996

Related U.S. Application Data

[63] Continuation of application No. 08/237,548, May 3, 1996, abandoned.

[30] Foreign Application Priority Data

May 3, 1993 [DE] Germany ............... 43 14 483

[51] Int. Cl.[7] ..................................................... G06T 7/20
[52] U.S. Cl. .......................................... 382/107; 348/155
[58] Field of Search ..................... 382/100, 103, 382/107; 348/169, 172, 154, 155

[56] References Cited

U.S. PATENT DOCUMENTS

| | | | |
|---|---|---|---|
| 3,953,670 | 4/1976 | Prince | 348/172 |
| 4,198,653 | 4/1980 | Kamin | 348/155 |
| 4,297,725 | 10/1981 | Shimizu et al. | 348/169 |
| 4,408,224 | 10/1983 | Yoshida | 348/155 |
| 5,099,324 | 3/1992 | Abe | 348/155 |
| 5,134,472 | 7/1992 | Abe | 348/155 |
| 5,243,418 | 9/1993 | Kuno et al. | 348/155 |
| 5,339,104 | 8/1994 | Hong | 348/155 |
| 5,355,326 | 10/1994 | Florent | 348/169 |
| 5,459,793 | 10/1995 | Naoi et al. | 348/155 |
| 5,552,823 | 9/1996 | Kageyama | 348/155 |
| 5,604,821 | 2/1997 | Ranganathan et al. | 382/236 |

FOREIGN PATENT DOCUMENTS 3827928  2/1990  Germany.

OTHER PUBLICATIONS

Gonzalez and Woods, *Digital Image Processing*. Addison–Wesley, pp. 41–43 and 503, Mar. 1992.

Gonzales et al, "Digital Image Processing," 1992, Addison–Wesley, pp. 465–468.

*Primary Examiner*—Jon Chang

[57] ABSTRACT

A monitoring system includes at least one camera (1) for generating a sequence of video images, and a control circuit (2). The control circuit (2) is provided for forming a difference image of two block-structured, consecutive video images and for generating status bits allocated to a stationary or a moving object for each block of a difference image. The control circuit (2) is further used for characterizing, by means of an area mark, contiguous status bits constituting an area and allocated to a moving object for determining an area parameter from the status bits of an area and for triggering an alarm when a predetermined condition of one or more area parameters is reached.

14 Claims, 1 Drawing Sheet

MONITORING SYSTEM

This is a continuation of application Ser. No. 08/237,548, filed May 3, 1996, now abandoned.

BACKGROUND OF THE INVENTION

Description of the Realated Art

The invention relates to a monitoring system comprising at least one camera for generating a sequence of video images of a room to be monitored, and a control circuit for setting off an alarm at a significant change of a plurality of consecutive video images.

A video-phone device, which is used for room monitoring, is known from DE-A1-38 27 928. This video-phone device is provided with a monitoring circuit which stores images supplied by a camera in the video-phone device. In a comparison circuit incorporated in the monitoring circuit, the image supplied by the camera is compared with a stored image which has been recorded a short time before and an alarm is triggered when the two images to be compared differ by a predetermined extent.

In the known video monitoring system the complete image data are processed in the monitoring circuit, so that the alarm is triggered in real time only with fast and expensive circuits.

SUMMARY OF THE INVENTION

It is therefore an object of the invention to provide a monitoring system in which the alarm is triggered in real time, using a reduced number of data.

This object is solved by a monitoring system of the type described in the opening paragraph, which system comprises at least one camera for generating a sequence of video images, and a control circuit which is provided for forming a difference image of two block-structured, consecutive video images, generating status bits having a value associated with a stationary or a moving object for each block of a difference image, assigning an area mark to contiguous status bits constituting an area each status bit having a value associated with a moving object, determining one or more area parameters from the status bits of an area, and triggering an alarm when a predetermined condition of the one or more area parameters is reached.

By means of a control circuit, the monitoring system according to the invention forms a sequence of difference images of two consecutive video images supplied by a camera. The difference images are structured in blocks of, for example 16×16 or 8×8 pixels. Such block-structured difference images can be supplied, for example by a video coding/decoding device operating in accordance with the CCITT standard H.261. A status bit is formed for each block, which bit has a value indicating whether the block is to be associated with a stationary or a moving object or scene. A status bit can be found either from a motion vector allocated to a block (cf. CCITT standard H.261) or in accordance with a statistical method. A logic "1" for a moving object and a logic "0" for a stationary object may be allocated to the status bit. A circuit arrangement for determining the status bits is known, for example from EP-A-0 474 304, which corresponds to U.S. patent application Ser. No. 08/202,843, filed Feb. 15, 1994.

To eliminate interference and noise in the status image composed of status bits, a spatial and temporal filtering operation can be performed. Subsequently, the control circuit determines areas representing a moving object. An area mark is assigned to each status bit of such an object. Circuit arrangements assigning area marks and performing the mentioned filtering operation are also known from EP-A-0 474 304.

The control circuit determines given area parameters by means of the status bits. For example, the center of each area is determined by summation of all coordinates and subsequent division by the number of status bits for each area. The size of an area may also be determined by counting the status bits allocated to the area.

The control circuit sets off an alarm when a predetermined condition of one or more area parameters is reached. For example, the alarm may be triggered when the size of an object or the center reach a given threshold value. Moreover, the areas can also be checked on whether they have a given shape. By means of a reduced number of image data, the invention provides the possibility of triggering an alarm in a flexible way and adapted to a multitude of requirements.

It is to be noted that the control circuit can be realized with discrete components or circuits, or also by means of a processor and an associated program.

The control circuit triggers the alarm when the center or the centers and/or the size of an object reach a predetermined condition. The control circuit is provided for triggering an alarm when the position of the center of an area reaches a predetermined position of the video image, and/or the center of an area moves in a predetermined direction, and/or a predetermined speed of the moving center is exceeded, and/or the center moves in a predetermined path, and/or a predetermined size of an area is reached, and/or the size of the area increases or decreases in a predetermined manner, and/or a predetermined size of a given number of areas is reached.

In determining the areas corresponding to a moving object, the control circuit assigns a status bit associated with a moving object after it has been found. This status bit is then assigned an area mark indicating. Subsequently, all adjacent status bits are checked on whether they are also associated with the moving object. Thus, initially all status bits of an area are searched before the next area is determined. The resultant array of status bits and assigned area marks is referred to as a status image.

When the alarm is triggered under the condition that at least two consecutive status images are compared, the areas of the consecutive status images must be identified as corresponding. The following measure is used in this case. The control circuit is provided for computing the distances between all centers of one of two consecutive difference images with those of the other of the two consecutive difference images, and for identifying as corresponding, those areas of the consecutive difference images at a minimum distance between the centers from one difference image to the next.

A status bit of a block can be determined in that, for each block, the control circuit forms the absolute value of each difference image pixel of two consecutive video images, forms a sum of the absolute values, sums the absolute values exceeding a first threshold value, and assigns a status bit having a value associated with a moving object when the sum exceeds a second threshold value and the count exceeds a third threshold value. The threshold values are dependent on, for example the camera(s) used and are to be optimized in special cases.

The invention also relates to a circuit arrangement for a monitoring system which comprises at least a camera for generating a sequence of video images, and a control circuit for forming a difference image of two block-structured, consecutive video images and for generating status bits associated with a stationary or a moving object for each block from a difference image. For example, a video coding/decoding device operating in accordance with the CCITT standard H.261 can supply such block-structured difference images to the circuit arrangement. The circuit arrangement comprises an analysis circuit which may be part of the control circuit and is provided for assigning an area mark to contiguous status bits constituting an area associated with a moving object, determining one or more area parameters from the status bits of an area, and triggering an alarm when a predetermined condition of the one or more area parameters is reached.

BRIEF DESCRIPTION OF THE DRAWING

These and other aspects of the invention will be apparent from and elucidated with reference to the embodiments described hereinafter.

In the drawing.

DETAILED DESCRIPTION OF THE PREFERRED EMBODIMENTS

Figure 1:
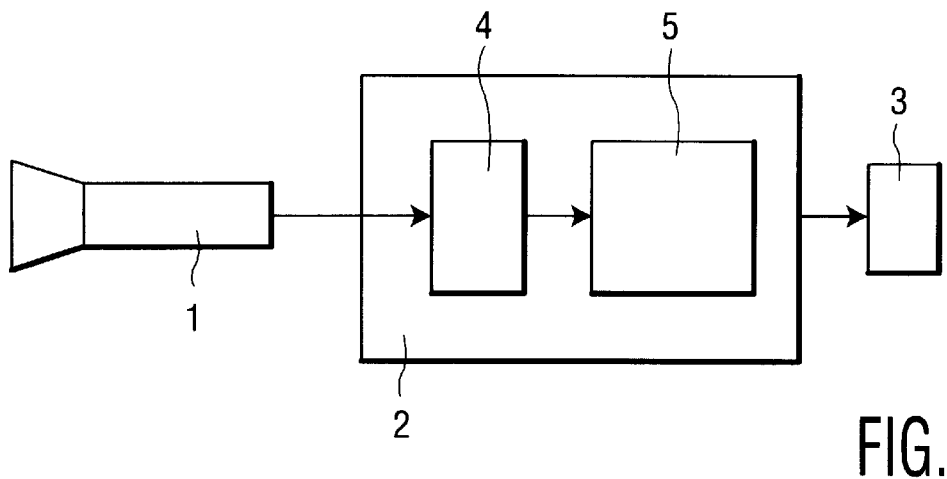
FIG. 1 shows an embodiment of a monitoring system.

FIG. 1 shows a monitoring system comprising a camera 1, a control circuit 2 and an alarm device 3. The control circuit 2 comprises a preprocessing circuit 4 and an analysis circuit 5. The preprocessing circuit 4 receives video signal (video images) from the camera 1 and supplies status images to the analysis circuit 5 which controls the alarm device 3. The preprocessing circuit 4 and the analysis circuit 5 may comprise discrete components or a program-controlled processor with appropriate peripheral components. It will hereinafter be assumed that the preprocessing circuit 4 and the analysis circuit 5 comprise a processor each. Both circuits 4 and 5 may also be realised with a single processor.

In the preprocessing circuit 4, block-structured difference images are generated from consecutive video images. Subsequently, a status image comprising status bits is formed from a difference image. A status bit indicates whether a block is associated with a moving object. For example, blocks of 8×8 pixels are formed and the pixels of equal blocks of two consecutive video images are subtracted from one another. The absolute values of all difference image pixels of a block are summed so that the sum $SU_{block}$ is obtained:

$$SU_{block} = \sum_{i,j} |f(i, j, t) - f(i, j, t-1)|$$

in which f(i,j,t) denote a pixel, i denotes a column coordinate, j denotes a row coordinate and t denotes an instant. Subsequently, the count sum $AN_{block}$ is formed:

$$AN_{block} = \sum_{d} H(d); d > d_t$$

with $d = |f(i, j, t) - f(i, j, t-1)|$ and H(d) is the frequency of d within a block (number of the pixels within a block whose value is d).

A status bit of a block is determined in accordance with the following formula:

$$s = \{SU_{block} > T_1\} \wedge \{AN_{block} > T_2\}$$

in which $T_1$ and $T_2$ represent two threshold values and the status bit s will be logic "1" when the status bit represents a moving object and logic "0" when the status bit represents a stationary object. The threshold values $d_t$, $T_1$ and $T_2$ depend, for example on the camera used and are to be optimized in special cases.

In the preprocessing circuit 4 the status bits are subsequently spatially and temporally filtered so as to suppress interference and noise. The spatial filtering operation can be described by way of the following program run:

count adjacent status bits s having the same status as the status bits to be checked;

is the number larger than a given threshold value $T_3$?

yes: do not change status bit to be checked;

no: invert status bit to be checked.

When the number of adjacent status bits having the same status as the status bit to be checked is larger than a given threshold value $T_3$, which may be equal to, for example three, the checked status bit is not changed. In the opposite case, the status bit is inverted.

In the temporal filtering operation, the status bits of a plurality of consecutive images are subjected to a disjunctive combination. For example, three consecutive status bits can be combined. The status bits of the two previous images are buffered in this case.

The filtered status bits are applied to the analysis circuit 5. In the analysis circuit 5, areas corresponding to a moving object are searched, i.e. areas in which the status bits are equal to "1". The area search can be described by way of the following program run:

set all area marks to zero ($m(x_i,y_j):=0$);

set area counter to one (b:=1);

bit counter z:=set to 0;

check the status bits $s(x_i,y_j)=1$ in a given sequence until a status bit is s=1

(start status bit);

set bit counter to one (z:=1);

set associated area mark to b (m:=b);

start of loop:

all status bits adjacent to the start status bit which are equal to 1 and whose associated area mark is m=0 to be set at m:=b and bit counters to be raised by one unit (z:=z+1);

have all neighbors of status bits whose area mark m=1, been checked?
no: fix such a status bit as a start status bit and jump to start of loop;
area counter b to be raised by one unit (b:=b+1);
number of status bits (count of the bit counter) to be stored per area ($z_b$):
set bit counter to zero (z:=0);
further check the status bits in given sequence until a status bit is s=1 and associated area mark is m≠40;
set associated area mark to b (m:=b);
set bit counter to one (z:=1);
jump to start of loop;
end of loop.

First, all area marks $m(x_i,y_j)$ which are assigned to the status bits are set to zero. The variables $x_i,y_j$ denote coordinates in the status image. An area counter b is set to one and a bit counter z is set to zero. The status bits $s(x_i,y_j)$ are checked in a given sequence until a status bit s is equal to one. This status bit is referred to as the start status bit. The bit counter z is then set to one, the assigned area mark m is rendered equal to the contents of the area counter b and a jump is made in a loop.

At the start of the loop, all status bits adjacent to the start status bit are checked. If a status bit s is found which is equal to one and whose associated area mark m is equal to zero, this area mark m is set to b and the bit counter z is raised by one unit. Subsequently it is queried whether the neighbors of all status bits of the start status bit have been checked. If this is not the case, an adjacent status bit, whose neighbors have not yet been checked, is fixed as a start status bit and a jump back to the start of the loop is made. Thereby, a recursive method is realized with which an area is found which represents a moving object. When this area has been found, i.e. when all neighbors of the status bits whose area mark m is equal to one have been checked, the area counter b is raised by one unit. Moreover, the number of status bits (count of the bit counter z) is stored and the bit counter z is set to zero. Subsequently, the status bits are further checked in a given sequence until a status bit is found which is equal to one and whose associated area mark m is unequal to zero. The area mark m is rendered equal to the contents of the area counter b and the bit counter z is set to one. Subsequently, there is a jump back to the start of the loop.

Figure 2:
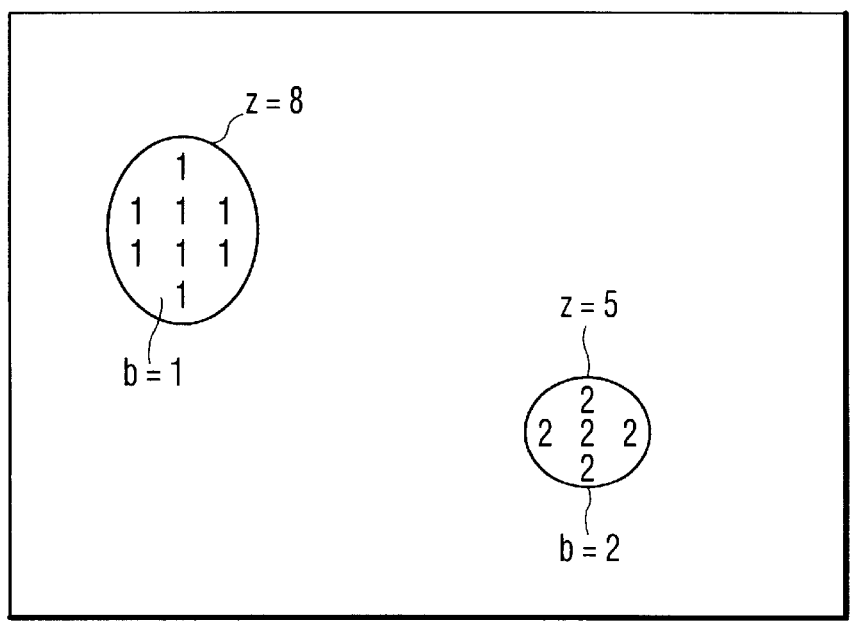
FIG. 2 shows a part of a status image with two areas.

FIG. 2 shows diagrammatically a status image with two areas (b=1 and b=2). The size of the first area (b=1) is eight in this example and the size of the second area (b=2) is five. As illustrated, the assigning of area marks to status bits is conveniently done by replacing each status bit associated with a moving area with the number of the area to which the status bit belongs.

The center should be determined for triggering the alarm in given cases. The center coordinates $x_{zb}$ and $y_{zb}$ for an area b are formed in accordance with the following formulas:

$$X_{zb} = \frac{\sum_{i=1}^{n_b} x_i}{n_b} \quad Y_{zb} = \frac{\sum_{i=1}^{n_b} y_i}{n_b}$$

in which $n_b$ indicates the number of status bits of an area.

In addition to determining the center of gravity in the analysis circuit 5, areas between two consecutive status images are also allocated. This allocation is realized by way of the following program run:
computing the distances of all centers between two consecutive images $$|SP_i(t)-SP_j(t-1)|$$

with i=1, ..., $b_{max}(t)$ and j=1, ..., $b_{max}(t-1)$;
assigning corresponding designations of centers of consecutive images having a minimum distance;
storing the centers, the assigned area designation and the size of the area (number of status bits) for the last n consecutive images in a list.

First, the distances of all centers of gravity between two consecutive images are computed:

$$|SP_i(t)-SP_j(t-1)|$$

in which $SP_i(t)$ denotes the centres of the areas of the last status image with i=1, ..., $b_{max}(t)$, while $SP_j(t-1)$ denotes the centres of the areas of the penultimate status image with j=1, ..., $b_{max}(t-1)$ and $b_{max}(t)$ denotes the number of areas of the last status image and $b_{max}(t-1)$ denotes the number of areas of the last status image but one. After the distances of all centers between two consecutive images have been computed, those centers which have a minimum distance are associated with each other. This means that the centers of two consecutive images having a minimum distance are centers of corresponding areas. For given uses it is necessary that a number of n centres and area sizes of consecutive status images are stored. For example, a sequence of ten consecutive status images (n=10) can be stored in a list.

Figure 3:
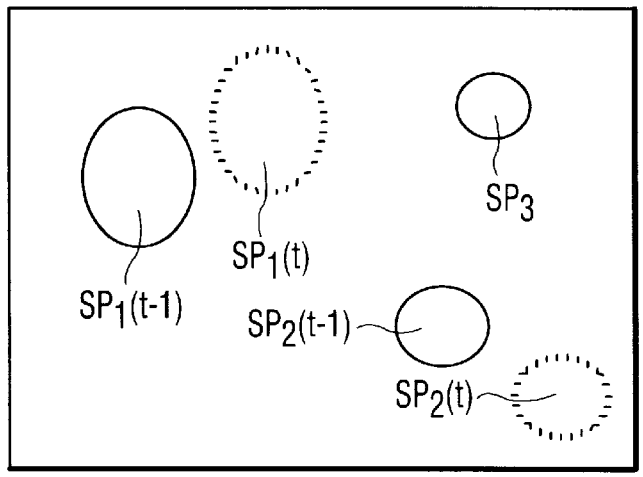
FIG. 3 shows a plurality of areas of two consecutive status images.

FIG. 3 shows diagrammatically areas of two consecutive images. Centers $SP_i(t)$ and $SP_j(t-1)$ are assigned to these areas. The centers $SP_1(t)$ and $SP_1(t-1)$ are assigned to the area b=1 and the centers $SP_2(t)$ and $SP_2(t-1)$ are assigned to the area b=2. The area b=3 with the center $SP_3$ may either have been added to, or is no longer present in the last image.

An alarm is triggered by the analysis circuit 5, i.e. a control signal is applied to the alarm device 3 when a predetermined condition of one or more area parameters has been reached. Such an area parameter may be, for example the center of gravity or the size of an area. For example, an alarm is generated by the analysis circuit 5 when the center of an area reaches a given position of the status image. The center coordinate is then compared with a stored coordinate. The alarm will be triggered if the comparison result proves that the center coordinate is equal to the predetermined coordinate.

An alarm may also be triggered if more consecutive center of gravity show a given direction of motion. In this case it is checked whether a given number of center coordinates is present in predetermined image areas.

An alarm may also be triggered, for example when the center of an object or of an area moves at a speed which exceeds a predetermined threshold value. In this case, a plurality of consecutive centers of an area is checked and the alarm will be triggered when the path covered within the image exceeds a given threshold value. Likewise, the analysis circuit 5 may apply a control signal to the alarm device 3 when the centre of an object moves in a predetermined path.

The size of an area is given as a further area parameter. As indicated above, the size of an area is defined by the number of status bits of this area. For example, an alarm may be generated when the size of an area exceeds a predetermined threshold value. In this case it is compared whether this threshold value (for example, 30 status bits per area) is exceeded.

An alarm may also be triggered when the size of an area increases or decreases in a predetermined manner or when the size of a predetermined number of objects is below or above a given threshold value.

What is claimed is:

1. A monitoring system comprising at least one camera for generating a sequence of video images, and a control circuit for operating on the sequence of video images, said control circuit being configured for:
   forming a difference image of two block-structured, consecutive video images,
   generating status bits having a value associated with a stationary or a moving object for each block of a difference image,
   assigning an area mark to contiguous status bits constituting an area and having a value associated with a moving object,
   determining one or more area parameters from the status bits of an area, and
   triggering an alarm when a predetermined condition of the one or more area parameters is reached,
   wherein the control circuit is configured for triggering the alarm on the occurrence of one or more of the following:
      a center of an area reaches a predetermined position in the video image,
      the center of an area moves in a predetermined direction,
      a predetermined speed of a moving center of an area is exceeded,
      the center of an area a moves in a predetermined path.

2. A monitoring system as claimed in claim 1, wherein the control circuit is also configured for determining the center or the size of an area as an area parameter.

3. A monitoring system as claimed in claim 2, wherein the control circuit is configured for determining the size of an area by counting the status bits constituting the area.

4. A monitoring system as claimed in claim 3, wherein the control circuit is configured for triggering an alarm on the occurrence of one or more of the following:
   a predetermined size of an area is reached,
   the size of the area increases or decreases in a predetermined manner,
   a given number of areas reach a predetermined size.

5. A monitoring system as claimed in claim 2, wherein said control circuit is configured for finding status bits associated with a moving object and for determining an area to which a status bit belongs each time after a status bit associated with a moving object has been found and after said status bit has been assigned an area mark, and the control circuit is also configured for checking all adjacent status bits to determine whether they also associated with the moving object.

6. A monitoring system as claimed in claim 5, wherein the control circuit is provided for computing the distances between all centers of two consecutive difference images and for identifying as corresponding the areas of the consecutive difference images at a minimum distance between the centers.

7. A monitoring system as claimed in claim 6, wherein, for each block, the control circuit is configured for:
   forming the absolute value of each difference image pixel of two consecutive video images,
   forming a sum of the absolute values,
   forming a count of the absolute values exceeding a first threshold value, and
   assigning a value associated with a moving object to a status bit, when the sum exceeds a second threshold value and the count exceeds a third threshold value.

8. A monitoring system as claimed in claim 1, wherein said control circuit is configured for finding status bits associated with a moving object and for determining an area to which a status bit belongs each time after a status bit associated with a moving object has been found and after said status bit has been assigned an area mark, and the control circuit is also configured for checking all adjacent status bits to determine whether they also associated with the moving object.

9. A monitoring system comprising at least one camera for generating a sequence of video images, and a control circuit for operating on the sequence of video images, said control circuit being configured for:
   forming a difference image of two block-structured, consecutive video images,
   generating status bits having a value associated with a stationary or a moving object for each block of a difference image,
   assigning an area mark to contiguous status bits constituting an area and having a value associated with a moving object,
   determining one or more area parameters from the status bits of an area, and
   triggering an alarm when a predetermined condition of the one or more area parameters is reached,
   wherein the control circuit is configured for triggering the alarm on the occurrence of one or more of the following:
      a predetermined size of an area is reached,
      the size of the area increases or decreases in a predetermined manner,
      a given number of areas reach a predetermined size.

10. A monitoring system comprising at least one camera for generating a sequence of video images, and a control circuit for operating on the sequence of video images, said control circuit being configured for:
   forming a difference image of two block-structured, consecutive video images,
   generating status bits having a value associated with a stationary or a moving object for each block of a difference image,
   assigning an area mark to contiguous status bits constituting an area and having a value associated with a moving object,
   determining one or more area parameters from the status bits of an area, and
   triggering an alarm when a predetermined condition of the one or more area parameters is reached,
   wherein the control circuit is provided for computing all distances between centers of one of two consecutive difference images and centers of the other of the two consecutive images and for identifying as corresponding the areas of the consecutive difference images at a minimum distance between the centers.

11. A monitoring system comprising at least one camera for generating a sequence of video images, and a control circuit for operating on the sequence of video images, said control circuit being configured for:
   forming a difference image of two block-structured, consecutive video images,
   generating status bits having a value associated with a stationary or a moving object for each block of a difference image,
   assigning an area mark to contiguous status bits Constituting an area and having a value associated with a moving object, determining one or more area parameters from the status bits of an area, and triggering an alarm when a predetermined condition of the one or more area parameters is reached, wherein, for each block, the control circuit is configured for:
   forming the absolute value of each difference image pixel of two consecutive video images,
   forming a sum of the absolute values,
   forming a count of the absolute values exceeding a first threshold value, and
   assigning a value associated with a moving object to a status bit, when the sum exceeds a second threshold value and the count exceeds a third threshold value.

12. A circuit arrangement for a monitoring system which comprises at least a camera for generating a sequence of video images, and a control circuit for forming a difference image of two block-structured, consecutive video images and for generating status bits allocated to a stationary or a moving object for each block from a difference image, wherein an analysis circuit is provided for:

assigning an area mark to contiguous status bits constituting an area and having a value associated with a moving object, determining one or more area parameters from the status bits of an area, and triggering an alarm when a predetermined condition of the one or more area parameters is reached, wherein the control circuit is configured for triggering an alarm on the occurrence of one or more of the following:
   a center of an area reaches a predetermined position in the video image,
   the center of an area moves in a predetermined direction,
   a predetermined speed of a moving center of an area is exceeded,
   the center of an area moves in a predetermined path.

13. A circuit arrangement for a monitoring system which comprises at least a camera for generating a sequence of video images, and a control circuit for forming a difference image of two block-structured, consecutive video images and for generating status bits allocated to a stationary or a moving object for each block from a difference image, wherein an analysis circuit is provided for:

assigning an area mark to contiguous status bits constituting an area and having a value associated with a moving object, determining one or more area parameters from the status bits of an area, and triggering an alarm when a predetermined condition of the one or more area parameters is reached, wherein the control circuit is configured for triggering an alarm on the occurrence of one or more of the following:
   a predetermined size of an area is reached,
   the size of the area increases or decreases in a predetermined manner,
   a given number of areas reach a predetermined size.

14. A circuit arrangement for a monitoring system which comprises at least a camera for generating a sequence of video images, and a control circuit for forming a difference image of two block-structured, consecutive video images and for generating status bits allocated to a stationary or a moving object for each block from a difference image, wherein an analysis circuit is provided for:

assigning an area mark to contiguous status bits constituting an area and having a value associated with a moving object, determining one or more area parameters from the status bits of an area, and triggering an alarm when a predetermined condition of the one or more area parameters is reached, wherein, for each block, the control circuit is configured for:
   forming the absolute value of each difference image pixel of two conseclusive video images,
   forming a su m of the absolute values,
   forming a count of the absolute values exceeding a first threshold value, and
   assigning a value associated with a moving object to a status bit, when the sum exceeds a second threshold value and the count exceeds a third threshold value.

* * * * *